(12) United States Patent
Yokoyama et al.

(10) Patent No.: US 10,994,674 B2
(45) Date of Patent: May 4, 2021

(54) GROMMET

(71) Applicants: Yazaki Corporation, Tokyo (JP); TOYOTA JIDOSHA KABUSHIKI KAISHA, Toyota (JP)

(72) Inventors: Satoshi Yokoyama, Toyota (JP); Kazuyuki Kumoi, Toyota (JP); Akihito Kouketsu, Kariya (JP); Masanori Suzumura, Kariya (JP); Kiyotsugu Miura, Kariya (JP)

(73) Assignees: YAZAKI CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 16/444,488

(22) Filed: Jun. 18, 2019

(65) Prior Publication Data
US 2019/0389403 A1 Dec. 26, 2019

(30) Foreign Application Priority Data
Jun. 22, 2018 (JP) .............................. JP2018-118964

(51) Int. Cl.
| | | |
|---|---|---|
| *H02G 3/22* | (2006.01) | |
| *B60R 16/02* | (2006.01) | |
| *B60J 5/04* | (2006.01) | |

(52) U.S. Cl.
CPC ......... *B60R 16/0222* (2013.01); *B60J 5/0418* (2013.01); *H02G 3/22* (2013.01)

(58) Field of Classification Search
CPC .......... H02G 3/22; H02G 3/0468; H02G 3/04; H02G 3/36; H02G 3/0406; B60R 16/0222; B60R 16/0207; B60R 16/0215; B60R 16/00; B60J 5/04; B60J 5/0401; B60J 5/0412; B60J 5/0413; B60J 5/0415; B60J 5/0416; H01B 17/30; H01B 17/26; H01B 17/58; H01B 17/583
USPC .... 174/650, 152 R, 152 G, 153 G, 135, 142, 174/137 R, 151, 17 CT; 248/56; 439/271, 272; 16/2.1, 2.2
See application file for complete search history.

(56) References Cited

U.S. PATENT DOCUMENTS

| | | | |
|---|---|---|---|
| 5,123,862 A | 6/1992 | Suzuki | |
| 6,995,317 B1 * | 2/2006 | Dzurilla | B60R 16/0222 174/153 G |
| 7,615,713 B2 * | 11/2009 | Bardella | B60R 16/0215 174/153 G |
| 8,925,147 B2 * | 1/2015 | Furuta | B60R 16/0222 174/153 G |
| 9,481,329 B2 * | 11/2016 | Yoshimura | B60R 16/0222 |
| 10,322,686 B2 * | 6/2019 | Urashima | B60R 16/0222 |

(Continued)

FOREIGN PATENT DOCUMENTS

| | | |
|---|---|---|
| JP | 2013-132167 A | 7/2013 |
| JP | 2015-204730 A | 11/2015 |

*Primary Examiner* — Angel R Estrada
(74) *Attorney, Agent, or Firm* — Sughrue Mion, PLLC

(57) ABSTRACT

A grommet includes a grommet body, an inner protector, and an outer member. The inner protector includes a protector body accommodated in a protector accommodating chamber of the grommet body. The protector body includes a rib on an outer surface of the protector body. The rib projects toward an inner surface of the protector accommodating chamber of the grommet body and extends along a direction toward a lower side from an upper side with the grommet installed in a vehicle body.

4 Claims, 12 Drawing Sheets

(56) References Cited

U.S. PATENT DOCUMENTS

| | | | | |
|---|---|---|---|---|
| 10,569,725 B2* | 2/2020 | Ogawa | ................ | B60R 16/0222 |
| 10,864,864 B2* | 12/2020 | Kotani | ................ | B60R 16/0222 |
| 2014/0291939 A1 | 10/2014 | Furuta et al. | | |

* cited by examiner

GROMMET

CROSS REFERENCE TO RELATED APPLICATION

This application is based upon and claims the benefit of priority from the prior Japanese Patent Application No. 2018-118964, filed on Jun. 22, 2018, the entire contents of which are incorporated herein by reference.

BACKGROUND

1. Technical Field

The disclosure relates to a grommet into which an electric wire of a wire harness is inserted for protection.

2. Related Art

JP 2015-204730 A proposes a grommet including a protector accommodating a wire harness and a grommet body including a protector accommodating space accommodating the protector. The grommet is mounted in a grommet accommodating recessed portion formed in a door panel of a vehicle. In the grommet, a bulging portion of a grommet base portion of the grommet body brought into contact with the grommet accommodating recessed portion of the door panel serves as a water stopping surface. A plurality of lip portions are formed in the water stopping surface. The plurality of lip portions of the bulging portion of the grommet base portion are brought into contact with the water stopped surface of the grommet accommodating recessed portion of the door panel, whereby water can be stopped between the grommet base portion and the water stopped surface.

SUMMARY

In the grommet, the protector base portion of the protector includes an electric wire insertion opening into which an electric wire of the wire harness is inserted, and a bundle portion for bundling the wire harness is arranged so as to project on the electric wire insertion opening side. For this reason, water flowing along the electric wire of the wire harness in the door may infiltrate into the protector accommodating space in the grommet body from the electric wire insertion opening of the protector base portion.

The disclosure is directed to a grommet capable of preventing the infiltration of water into a grommet body.

A grommet in accordance with some embodiments includes: a grommet body formed of an elastic body and including a protector accommodating chamber in the grommet body, wherein an electric wire is inserted into the grommet body; an inner protector formed of a member having a higher rigidity than a rigidity of the grommet body and accommodated in the protector accommodating chamber; and an outer member formed of a member having a higher rigidity than the rigidity of the grommet body, and the outer member being configured to mount the grommet body with the inner protector accommodated in the protector accommodating chamber with the grommet body sandwiched between the outer member and a grommet accommodating recessed portion of an attachment panel. The inner protector includes a protector body accommodated in the protector accommodating chamber of the grommet body. The protector body includes a rib on an outer surface of the protector body. The rib projects toward an inner surface of the protector accommodating chamber of the grommet body and extends along a direction toward a lower side from an upper side with the grommet installed in a vehicle body.

According to the above configuration, the rib is provided along the direction toward the lower side from the upper side on the outer surface of the protector body accommodated in the protector accommodating chamber of the grommet body, whereby water flows along the rib. This makes it possible to reliably prevent the infiltration of the water into the protector accommodating chamber in the grommet body.

DETAILED DESCRIPTION

Figure 1:
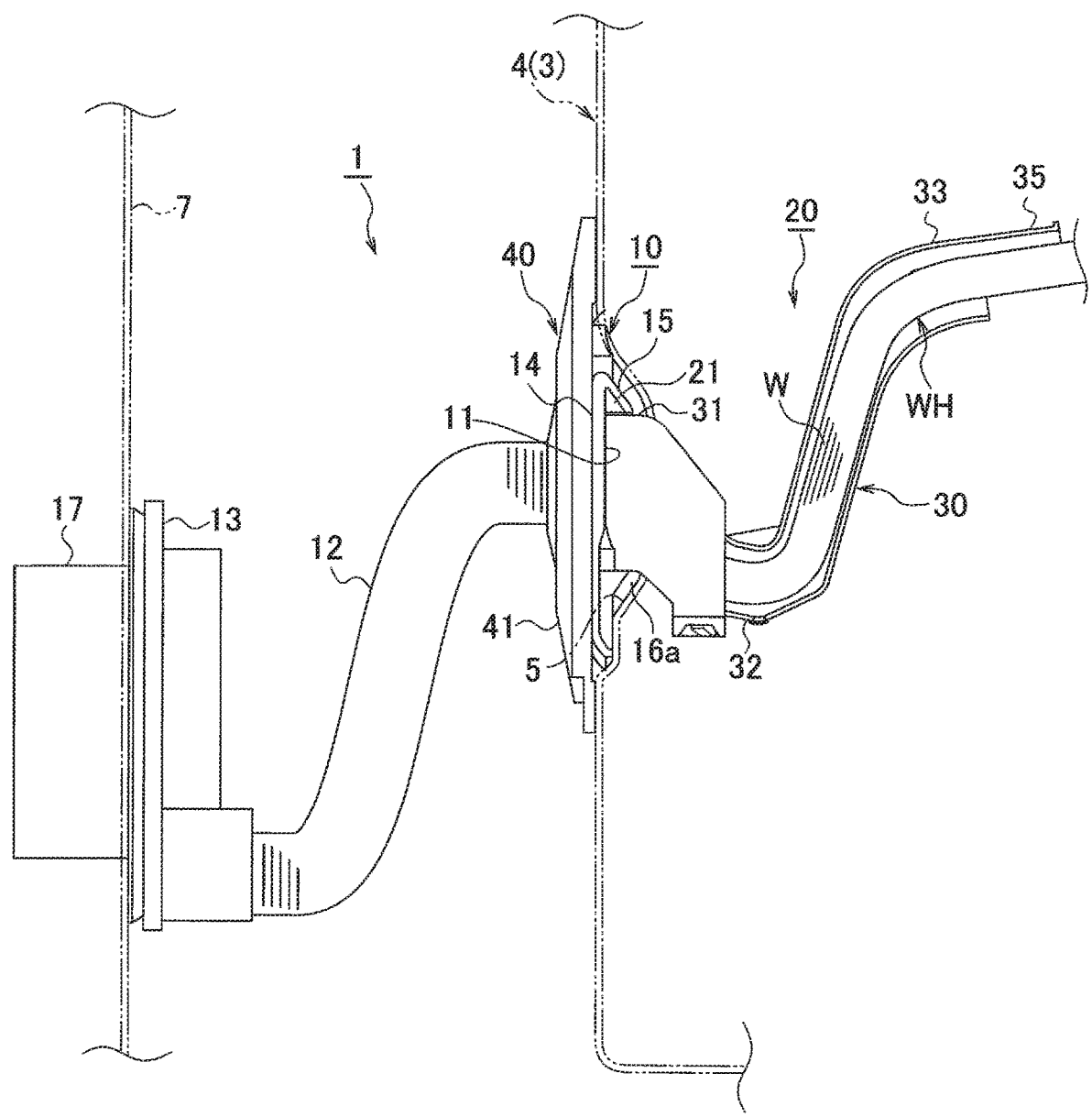
FIG. 1 is a side view illustrating an attached state of a grommet of an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
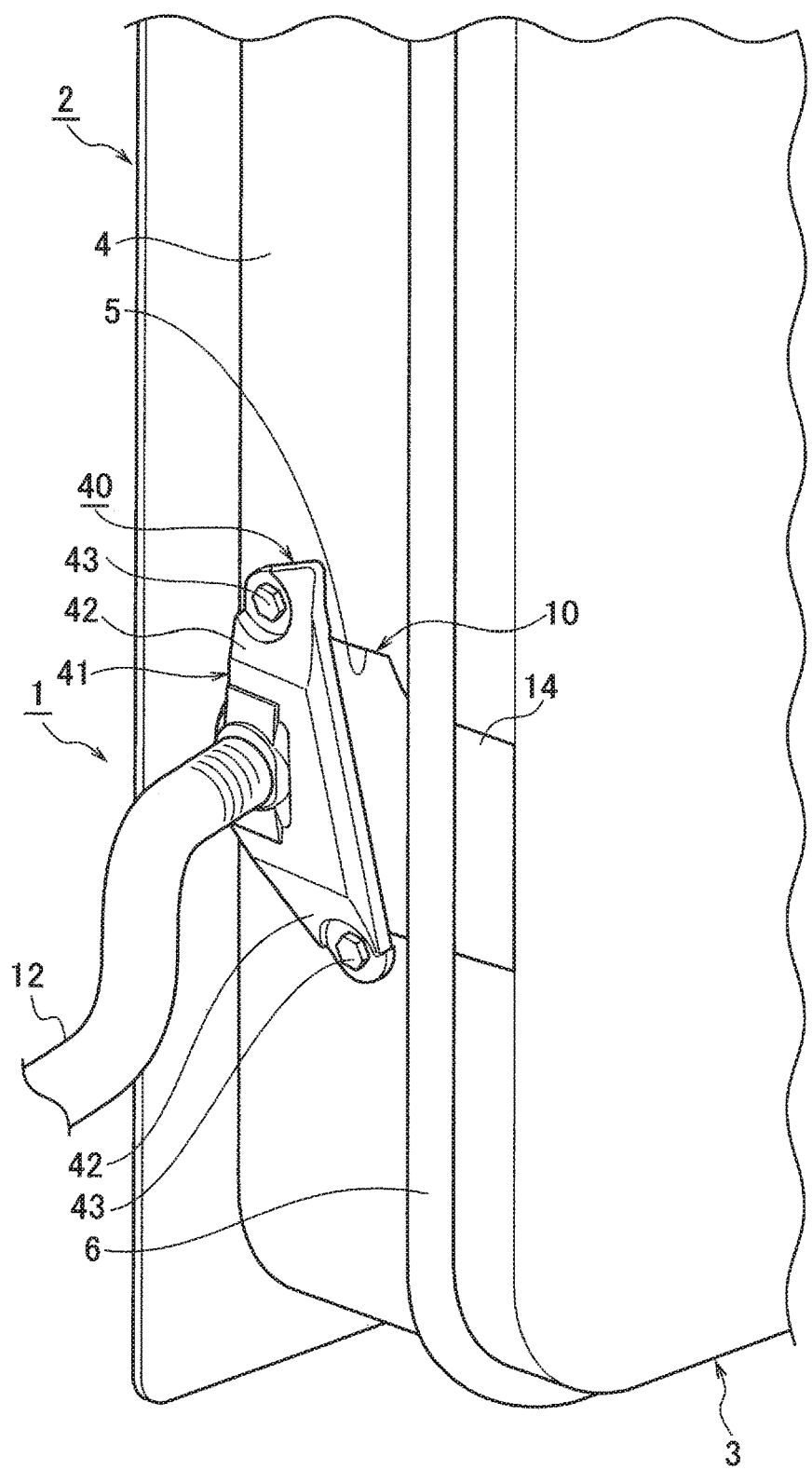
FIG. 2 is a partial perspective view of an essential portion illustrating the attached state of the grommet of FIG. 1.
Figure 3:
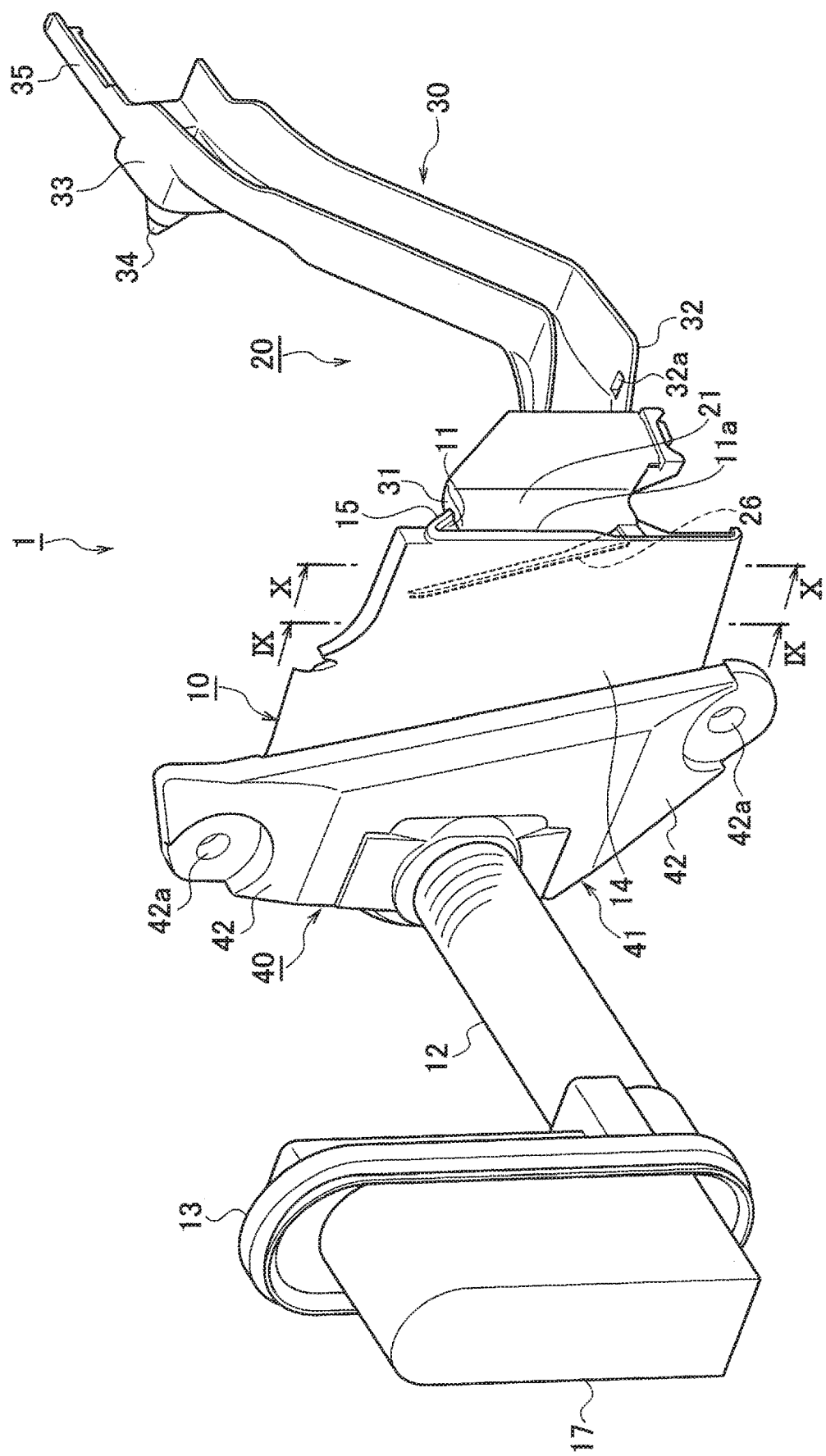
FIG. 3 is a perspective view of the grommet of FIG. 1 as viewed from the front side.
Figure 4:
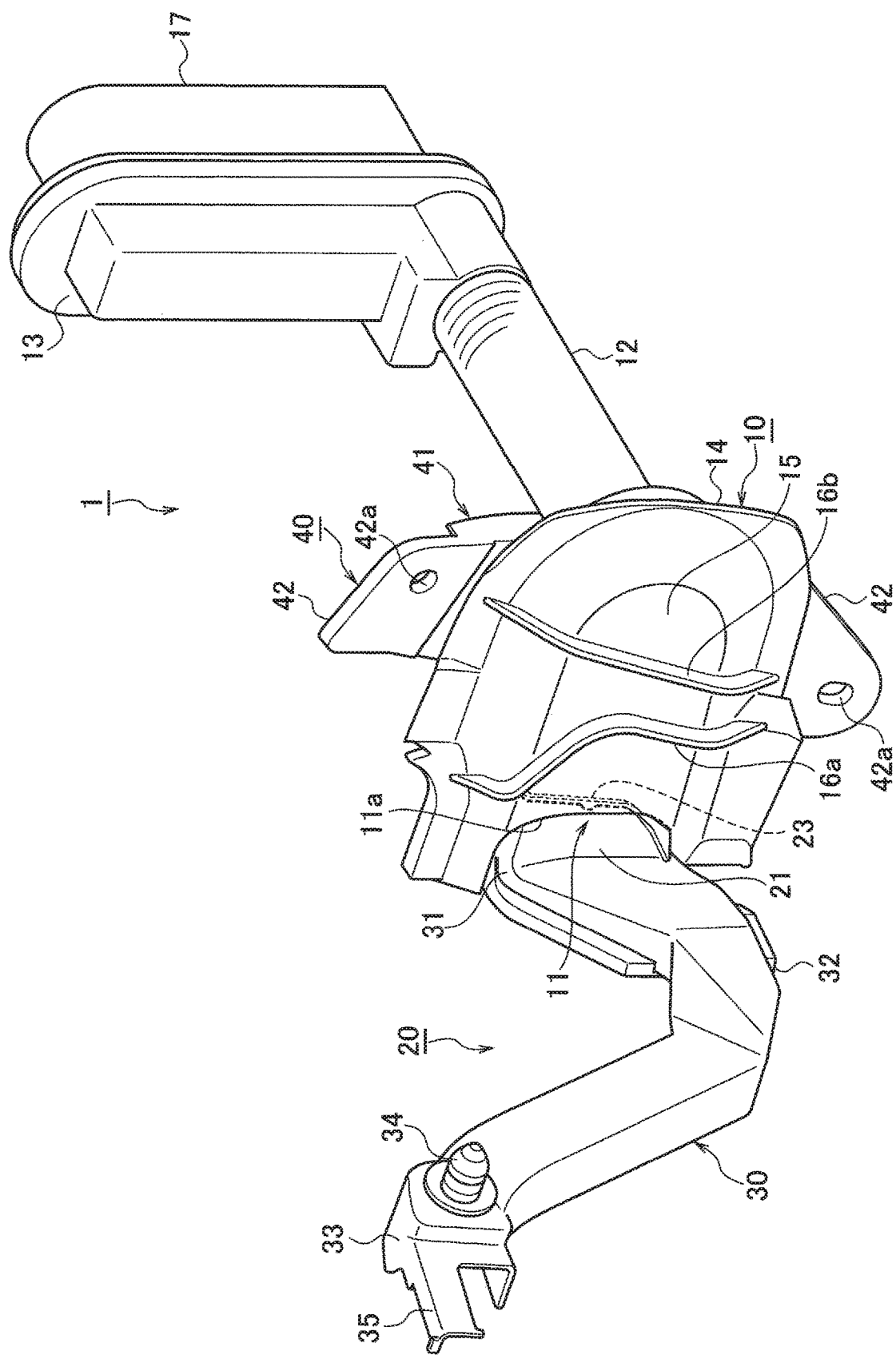
FIG. 4 is a rear view of the grommet of FIG. 1 as viewed from the rear side.
Figure 5:
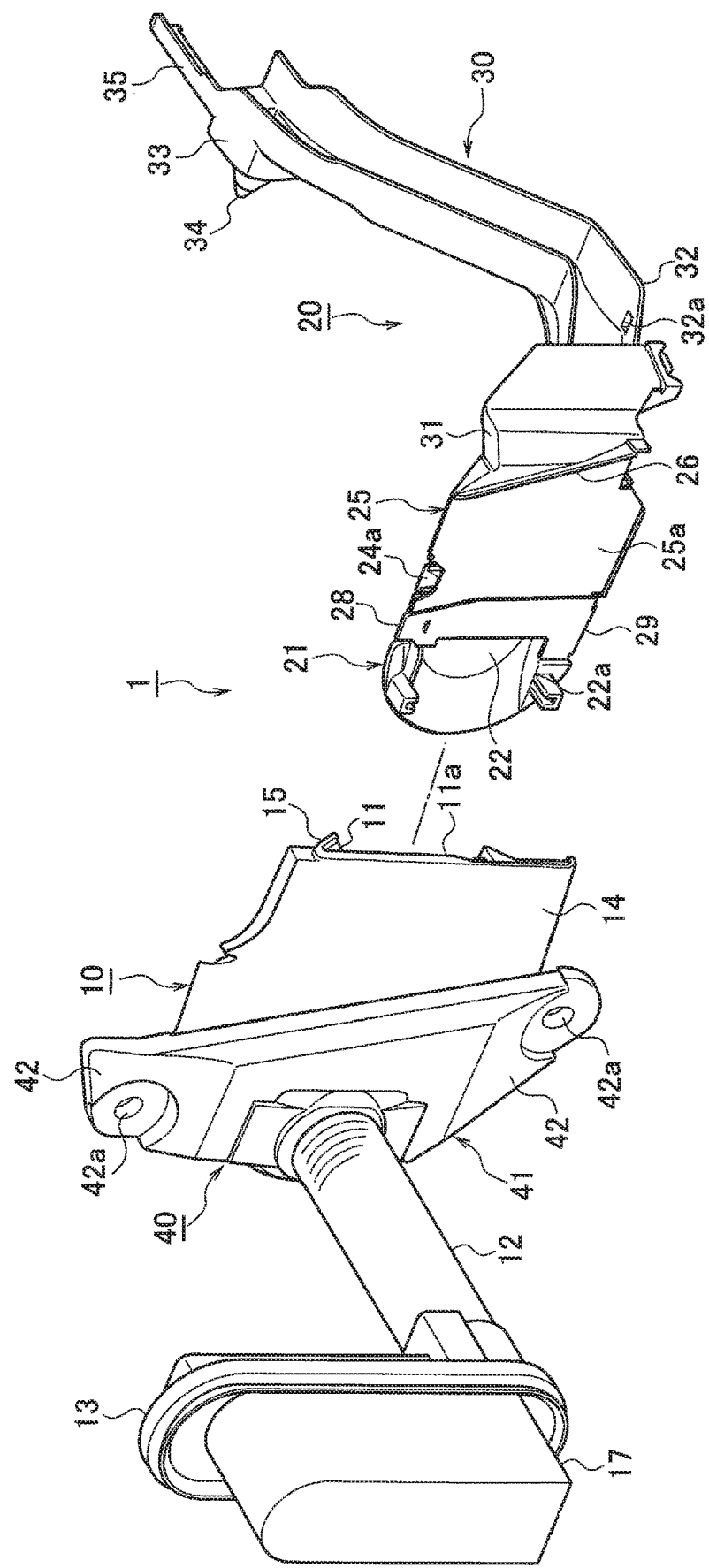
FIG. 5 is an exploded perspective view of the grommet of FIG. 1.
Figure 6:
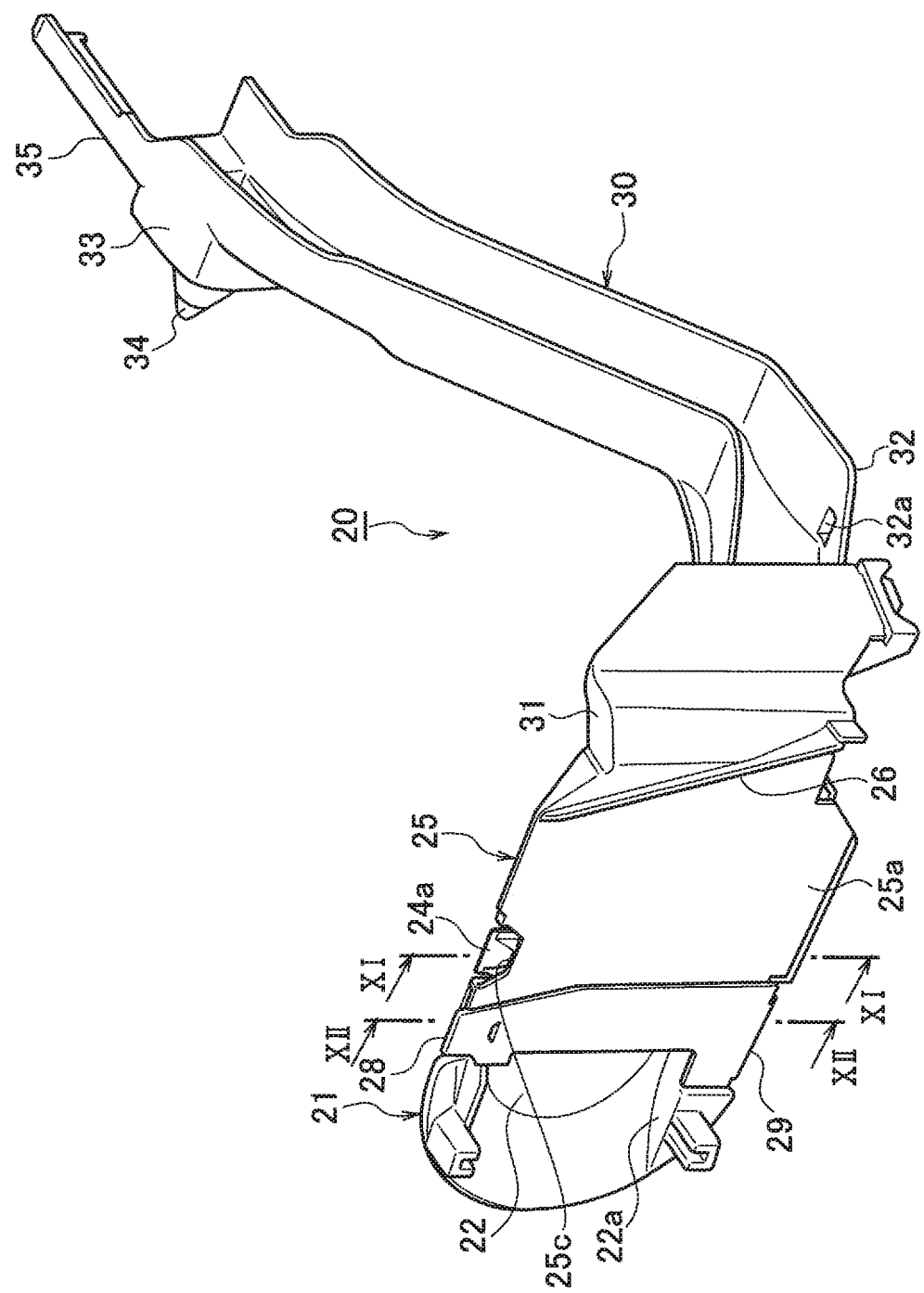
FIG. 6 is a perspective view of an inner protector used in the grommet of FIG. 1 as viewed from the front side.
Figure 7:
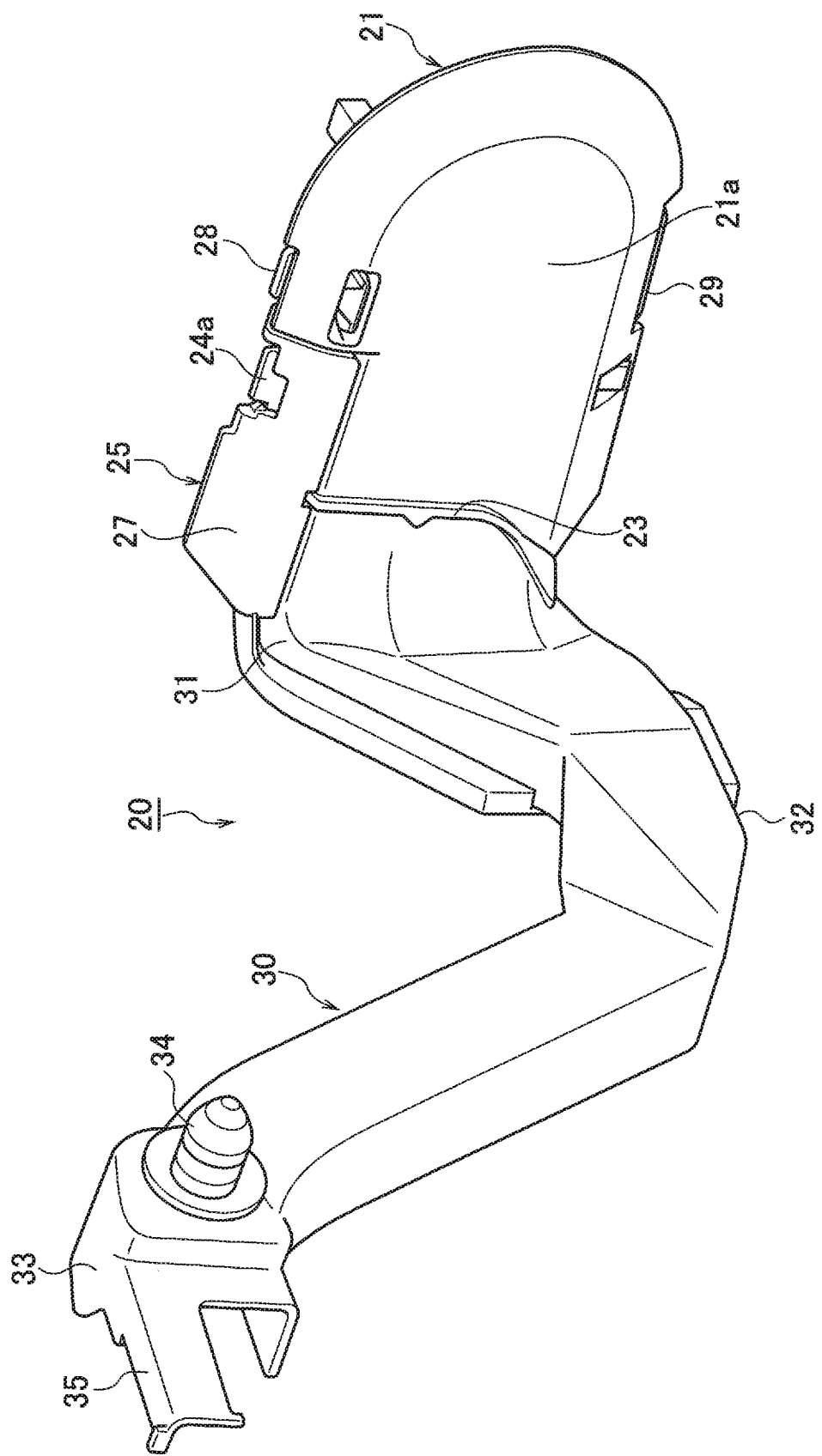
FIG. 7 is a perspective view of the inner protector of FIG. 6 as viewed from the rear side.
Figure 8:
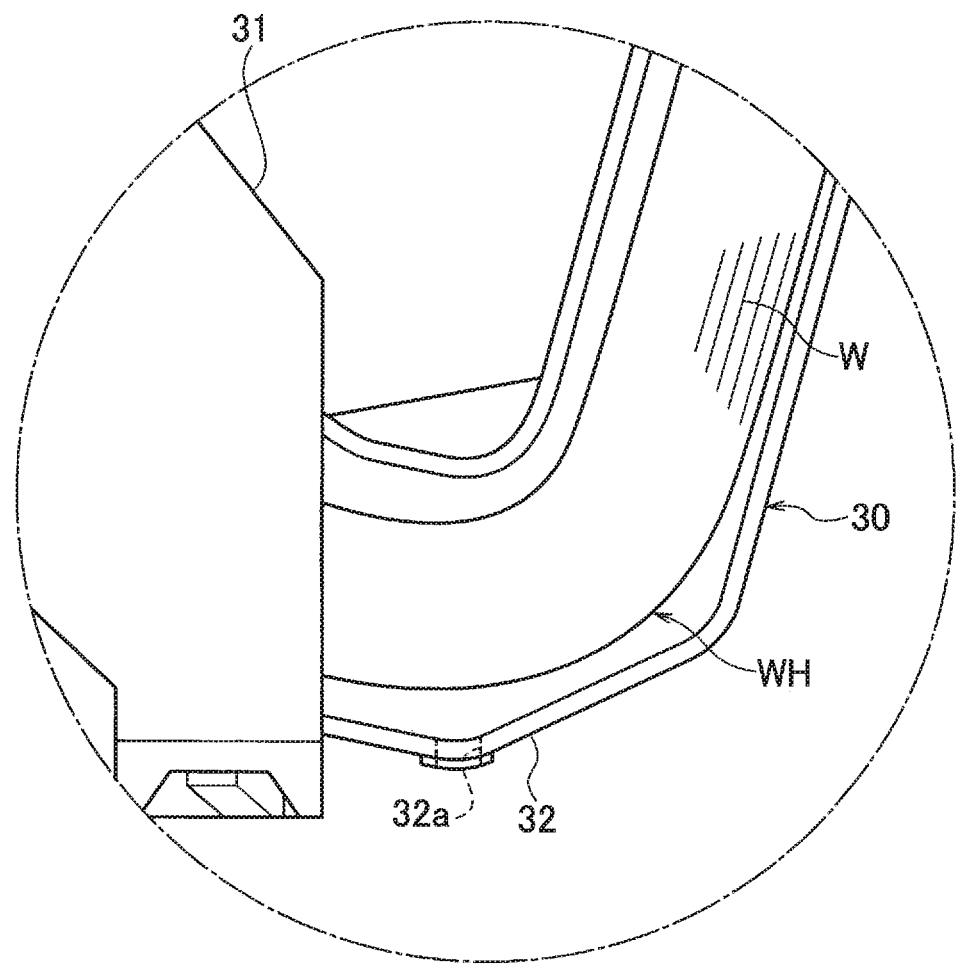
FIG. 8 is an enlarged side view of a water draining portion of the inner protector of FIG. 6.
Figure 9:
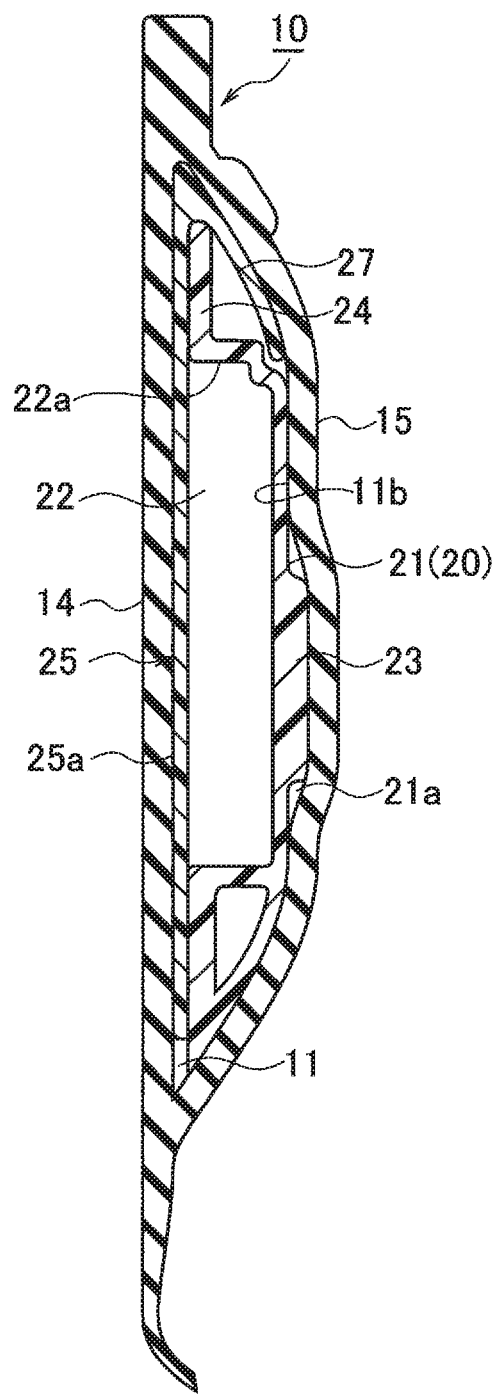
FIG. 9 is a cross-sectional view taken along line IX-IX in FIG. 3.
Figure 10:
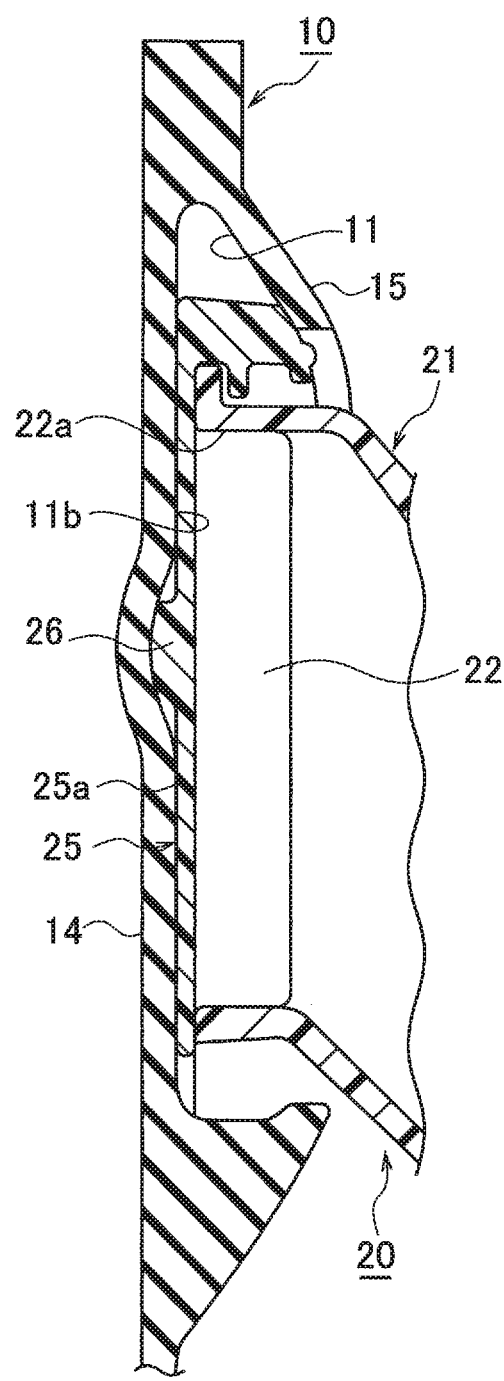
FIG. 10 is a cross-sectional view taken along line X-X in FIG. 3.
Figure 11:
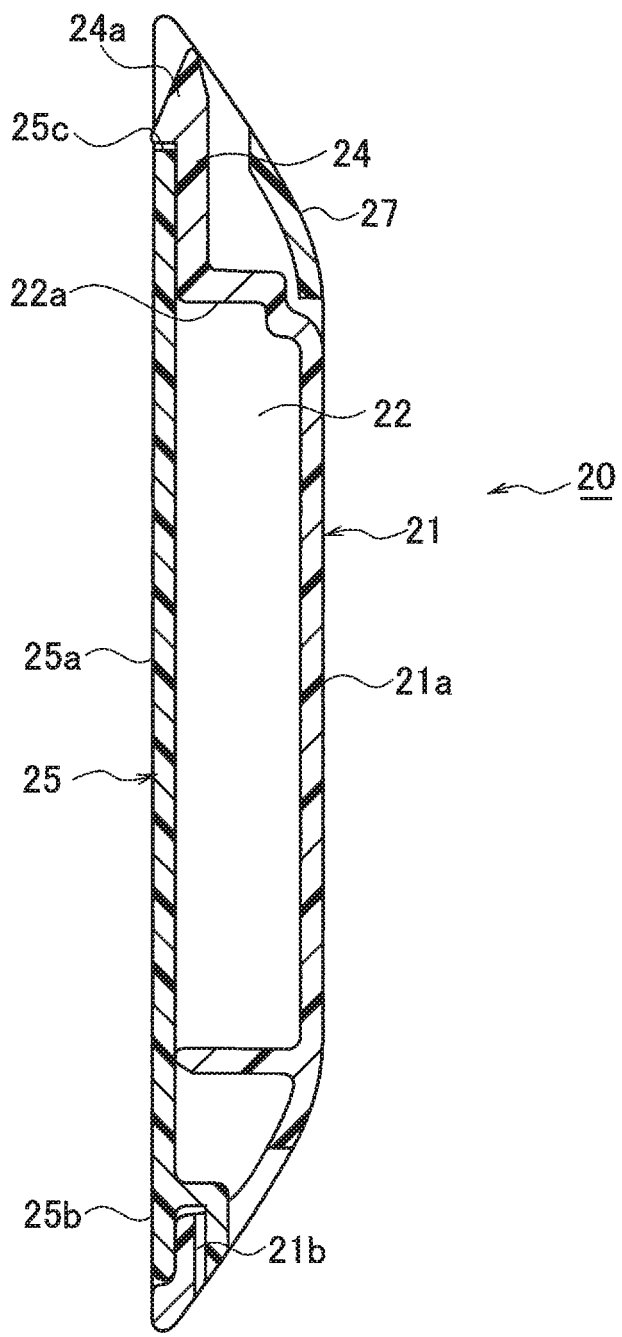
FIG. 11 is a cross-sectional view taken along line XI-XI in FIG. 6.
Figure 12:
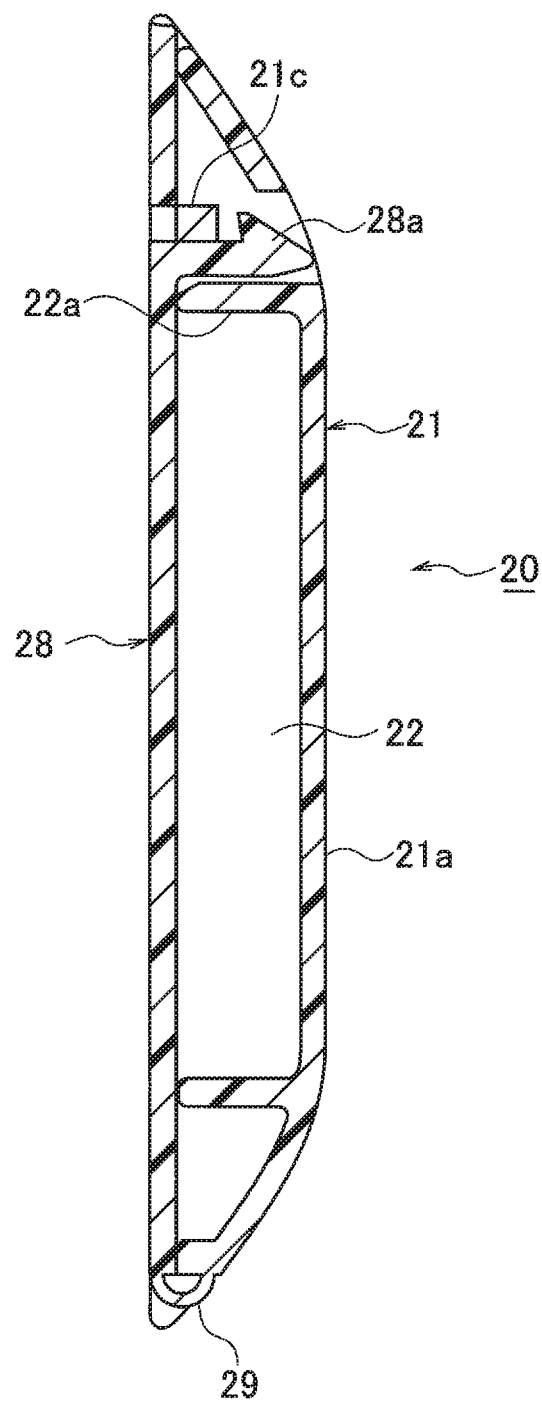
FIG. 12 is a cross-sectional view taken along line XII-XII in FIG. 6.

FIG. 1 is a side view illustrating an attached state of a grommet 1 of an embodiment; FIG. 2 is a partial perspective view of an essential portion illustrating the attached state of the grommet 1; FIG. 3 is a perspective view of the grommet 1 as viewed from the front side; FIG. 4 is a rear view of the grommet 1 as viewed from the rear side; FIG. 5 is an exploded perspective view of the grommet 1; FIG. 6 is a perspective view of an inner protector 20 used in the grommet 1 as viewed from the front side; FIG. 7 is a perspective view of the inner protector 20 as viewed from the rear side; FIG. 8 is an enlarged side view of a water draining portion of the inner protector 20; FIG. 9 is a cross-sectional view taken along line IX-IX in FIG. 3; FIG. 10 is a cross-sectional view taken along line X-X in FIG. 3; FIG. 11 is a cross-sectional view taken along line XI-XI in FIG. 6; and FIG. 12 is a cross-sectional view taken along line XII-XII in FIG. 6.

As illustrated in FIGS. 1 and 2, the grommet 1 protects an electric wire W of a wire harness WH arranged so as to straddle between a door (attachment body) 2 and a body (vehicle body) 7 of an automobile in a state where the electric wire W is inserted into the grommet 1. The grommet 1 includes a grommet body 10, an inner protector 20, and an outer member 40. The grommet body 10 is formed of an elastic body such as rubber. A protector accommodating chamber 11 is formed in the grommet body 10, and the electric wire W is inserted into the grommet body 10. The inner protector 20 is formed of a member having rigidity higher than that of the grommet body 10 and made of synthetic resin and the like, and is accommodated in the protector accommodating chamber 11. The outer member 40 is formed of a member having rigidity higher than that of the grommet body 10 and made of synthetic resin and the like. The outer member 40 mounts the grommet body 10 in which the inner protector 20 arranged in a grommet accommodating recessed portion 5 of a hinge side end face 4 of a door panel (attachment panel) 3 is accommodated in the protector accommodating chamber 11 with the grommet body 10 sandwiched between the grommet accommodating recessed portion 5 of the door panel 3 and the outer member 40.

As illustrated in FIGS. 1 to 5, the grommet body 10 made of rubber and the like is a sealing member for applying water stop between the grommet accommodating recessed portion 5 of the door panel 3 and the grommet body 10, and has the hollow protector accommodating chamber 11. The protector accommodating chamber 11 has a shape corresponding to that of the inner protector 20. The protector accommodating chamber 11 has a one end-side opening 11*a*. The opening 11*a* is an insertion hole of the inner protector 20. The other end side of the protector accommodating chamber 11 is in communication with a tubular portion 12 integrally formed so as to project on the grommet body 10. The tubular portion 12 is a concertina elastic tube into which the electric wire W of the wire harness WH is inserted. On the tip side of the tubular portion 12, a vehicle body-side grommet portion 13 extended to the body 7 side and attached to the body 7 is provided. As illustrated in FIG. 1, the vehicle body-side grommet portion 13 is arranged at a position lower than the mounting position of the outer member 40.

The surface of the grommet body 10 is a flat portion 14, and a weather strip 6 is laminated on the surface-side flat portion 14.

The water stopping surface as the rear surface of the grommet body 10 is a bulging portion 15 brought into contact with the grommet accommodating recessed portion 5 of the door panel 3, and a pair of water stop lips 16*a* and 16*b* are integrally formed so as to project on the bulging portion 15. The pair of water stop lips 16*a* and 16*b* of the bulging portion 15 of the grommet body 10 are brought into contact with the surface of the grommet accommodating recessed portion 5 of the door panel 3 to stop water between the surface and the grommet body 10.

As illustrated in FIGS. 5 to 7, the inner protector 20 made of synthetic resin and the like includes a protector body 21, a large rectangular plate-shaped cover (lid) 25 made of synthetic resin and the like, a small rectangular plate-shaped cover (lid) 28 made of synthetic resin and the like, and an electric wire guide body 30. The protector body 21 includes an electric wire insertion chamber 22, and is accommodated in the protector accommodating chamber 11 of the grommet body 10. The large rectangular plate-shaped cover 25 and the small rectangular plate-shaped cover 28 cover an opening 22*a* of the electric wire insertion chamber 22 of the protector body 21. The electric wire guide body 30 projects toward the outside of the protector accommodating chamber 11 from the protector body 21.

The protector body 21 includes upper and lower edge portions formed in a curved surface shape so as to form a space of the electric wire insertion chamber 22, and a grommet body 10 side end edge formed in an arc curved surface shape. The protector body 21 includes an outer surface 21*a* including a rib 23 integrally formed so as to project on the outer surface 21*a*, as illustrated in FIGS. 7 and 9. The rib 23 projects toward an inner surface 11*b* of the protector accommodating chamber 11 of the grommet body 10, and includes a lower edge inclined toward a support portion 31 side of the electric wire guide body 30 along a direction toward the lower side from the upper side in a state where the grommet 1 is installed in a vehicle.

As illustrated in FIGS. 6 and 10, a rib 26 is integrally formed so as to project also on an outer surface 25*a* of the large rectangular plate-shaped cover 25. The outer surface 25*a* of the large rectangular plate-shaped cover 25 covers the opening 22*a* of the electric wire insertion chamber 22 of the protector body 21. The rib 26 includes a lower edge projecting toward the inner surface 11*b* of the protector accommodating chamber 11 of the grommet body 10, and is inclined at an oblique angle toward a support portion 31 side of the electric wire guide body 30 from the upper end side along a direction toward the lower side from the upper side in a state where the grommet 1 is installed in a vehicle. As a result, the ribs 23 and 26 are arranged around the outer surface 21*a* of the protector body 21 and the outer surface 25*a* of the large rectangular plate-shaped cover 25 so that water easily flows along the ribs 23 and 26 of the outer surfaces 21*a* and 25*a*. This makes it possible to suppress or prevent the infiltration of the water into the protector accommodating chamber 11 in the grommet body 10.

As illustrated in FIG. 9, the upper edge portion of the protector body 21 includes a projecting wall portion 24 projecting to the outside of the opening 22*a* of the electric wire insertion chamber 22. The upper edge end of the large rectangular plate-shaped cover 25 includes an overhang wall portion 27 extended to the outside of a region covering the opening 22*a* of the electric wire insertion chamber 22 and covering the projecting wall portion 24 so as to surround the projecting wall portion 24. As a result, the water flowing from the upper side of the protector body 21 flows to the outer surface 21*a* side of the protector body 21 along the overhang wall portion 27, whereby the water does not hit the wire harness WH in the electric wire insertion chamber 22 of the protector body 21.

As illustrated in FIG. 11, the large rectangular plate-shaped cover 25 is openably and closably attached to the protector body 21 by locking a locking recessed portion 25*c* formed on the upper end portion to a locking projection 24*a* formed on the projecting wall portion 24 on the upper edge end side of the protector body 21 in a state where an engaging fork portion 25*b* formed on the lower end portion is engaged with a locking portion 21*b* formed on a lower end edge portion of the protector body 21.

As illustrated in FIG. 12, the small rectangular plate-shaped cover 28 is openably and closably supported via a hinge portion 29 integrally formed on the lower end edge portion of the protector body 21. The small rectangular plate-shaped cover 28 is attached to the protector body 21 by locking a locking projection hole 28a formed on the upper end portion to a locking wall portion 21c on the upper edge end side of the protector body 21.

As illustrated in FIGS. 1, and 3 to 7, the electric wire guide body 30 includes an inner space having a U-shaped cross section excluding the rectangular cylindrical support portion 31, and accommodates the electric wire W of the wire harness WH to derive the wire harness WH to a predetermined position in the door 2. The electric wire guide body 30 is integrally formed so as to project on the protector body 21. The electric wire guide body 30 is bent so that an intermediate position between the support portion 31 on the protector body 21 side and a tip portion 33 is lower than heights of both the support portion 31 and the tip portion 33 in a state where the grommet 1 is installed in the vehicle. That is, as illustrated in FIGS. 4 to 8, the electric wire guide body 30 is bent in a V-shape at an oblique angle so as to gradually lower toward the intermediate position from the support portion 31 and the tip portion 33. As illustrated in FIG. 8, a drainage hole 32a is formed in an intermediate portion 32 located at the lowest position between the support portion 31 and the tip portion 33.

A clamp 34 for attaching a door panel is integrally formed so as to project on the side surface of the tip portion 33 of the electric wire guide body 30. A bundling piece portion 35 for bundling the wire harness WH with a bundling band and the like is provided so as to project on the tip of the tip portion 33.

As illustrated in FIGS. 1 to 5, the outer member 40 is a fixing member for fixing the grommet body 10 to the grommet accommodating recessed portion 5 of the door panel 3, and includes a body portion 41 and a pair of fixing portions 42 and 42. The outer member 40 is fastened and fixed to the door panel 3 via a bolt 43 inserted into a bolt hole 42a formed in each of the pair of fixing portions 42 and 42.

As described above, according to the grommet 1 according to the embodiment, as illustrated in FIGS. 4 and 9, the protector body 21 includes the outer surface 21a including the rib 23 thereon. The rib 23 projects toward the inner surface 11b of the protector accommodating chamber 11 of the grommet body 10, and is extended along the direction toward the lower side from the upper side in a state where the grommet 1 is installed in the vehicle. As illustrated in FIGS. 3 and 10, the large rectangular plate-shaped cover 25 covering the opening 22a of the electric wire insertion chamber 22 of the protector body 21 includes the outer surface 25a including the rib 26 thereon. The rib 26 projects toward the inner surface 11b of the protector accommodating chamber 11 of the grommet body 10, and is extended along a direction toward the lower side from the upper side in a state where the grommet 1 is installed in a vehicle. As a result, even if water is applied to the grommet 1 in the door 2, the water in the grommet body 10 flows to the lower side of the door 2 along the ribs 23 and 26 of the inner protector 20. This makes it possible to suppress or prevent the infiltration of the water into the protector accommodating chamber 11 in the grommet body 10.

As illustrated in FIG. 9, the upper edge portion of the protector body 21 includes a projecting wall portion 24 projecting to the outside of the opening 22a of the electric wire insertion chamber 22. The upper edge end of the large rectangular plate-shaped cover 25 includes an overhang wall portion 27 extended to the outside of a region covering the opening 22a of the electric wire insertion chamber 22 and covering the projecting wall portion 24 so as to surround the projecting wall portion 24. As a result, the water flowing from the upper side of the protector body 21 flows to the outer surface 21a side of the protector body 21 along the overhang wall portion 27, whereby the water does not hit the wire harness WH in the electric wire insertion chamber 22 of the protector body 21 (or a small amount of water infiltrates).

As described above, even when water is applied to the grommet 1 in the door 2, the grommet 1 has a structure in which the water in the grommet body 10 does not adhere to the electric wire W of the wire harness HW in the protector body 21 accommodated in the grommet body 10, which makes it possible to prevent the water from infiltrating to the body 7 side from the door 2 side. As illustrated in FIG. 1, this makes it possible to increase the degree of freedom of route design in which the vehicle body-side grommet portion 13 of the grommet 1 is located at a position lower than the mounting position of the outer member 40 on the door 2 side (the route design of the wire harness WH arranged so as to straddle to the body 7 side from the door 2 side).

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:
1. A grommet comprising:
a grommet body formed of an elastic body and including a protector accommodating chamber in the grommet body, wherein an electric wire is inserted into the grommet body;
an inner protector formed of a member having a higher rigidity than a rigidity of the grommet body and accommodated in the protector accommodating chamber; and
an outer member formed of a member having a higher rigidity than the rigidity of the grommet body, and the outer member being configured to mount the grommet body with the inner protector accommodated in the protector accommodating chamber with the grommet body sandwiched between the outer member and a grommet accommodating recessed portion of an attachment panel, wherein
the inner protector includes a protector body accommodated in the protector accommodating chamber of the grommet body, and
the protector body includes a rib on an outer surface of the protector body, the rib projecting toward an inner surface of the protector accommodating chamber of the grommet body and extending along a direction toward a lower side from an upper side with the grommet installed in a vehicle body.
2. The grommet according to claim 1, wherein
the inner protector includes
the protector body including an electric wire insertion chamber, and
a lid configured to cover an opening of the electric wire insertion chamber of the protector body, and the lid includes a rib on an outer surface of the lid, the rib projecting toward the inner surface of the protector accommodating chamber of the grommet body and extending along the direction toward the lower side from the upper side with the grommet installed in the vehicle body.

3. The grommet according to claim 2, wherein
the protector body includes a projecting wall portion projecting to an outside of the opening of the electric wire insertion chamber, and
the lid includes an overhang wall portion extending to an outside from a portion covering the opening of the electric wire insertion chamber, the overhang wall portion covering and surrounding the projecting wall portion.

4. The grommet according to claim 1, wherein
the outer member is mounted in the grommet accommodating recessed portion of a door panel as the attachment panel via the grommet body, and
the grommet further comprises a vehicle body-side grommet portion extending from the grommet body toward the vehicle body, attached to the vehicle body, and arranged at a position lower than a mounting position of the outer member.

\* \* \* \* \*